(12) United States Patent
Nishimura

(10) Patent No.: US 6,459,476 B2
(45) Date of Patent: Oct. 1, 2002

(54) FORWARD CONDITION DETECTING APPARATUS FOR VEHICLES

(75) Inventor: Kenichi Nishimura, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/795,707

(22) Filed: Mar. 1, 2001

(30) Foreign Application Priority Data

Mar. 2, 2000 (JP) ........................................ 2000-056579
Mar. 21, 2000 (JP) ........................................ 2000-078433

(51) Int. Cl.$^7$ ............................. G01C 3/08; G01S 13/00
(52) U.S. Cl. ........................................ 356/5.01; 342/74
(58) Field of Search ............ 342/74, 75; 356/3.01–5.15

(56) References Cited

U.S. PATENT DOCUMENTS

| | | | |
|---|---|---|---|
| 5,313,213 A | | 5/1994 | Neumann et al. ............ 342/165 |
| 5,808,728 A | | 9/1998 | Uehara ...................... 356/5.01 |
| 5,877,680 A | * | 3/1999 | Okuchi et al. .............. 340/468 |
| 6,020,844 A | * | 2/2000 | Bai et al. .................... 342/165 |
| 6,026,353 A | * | 2/2000 | Winner ....................... 702/183 |
| 6,122,040 A | * | 9/2000 | Arita et al. ................. 356/4.01 |
| 6,157,294 A | | 12/2000 | Urai et al. ................... 340/436 |
| 6,278,912 B1 | * | 8/2001 | Amano .......................... 701/1 |
| 6,294,987 B1 | * | 9/2001 | Matsuda et al. ............. 340/436 |

FOREIGN PATENT DOCUMENTS

| | | |
|---|---|---|
| EP | 0 965 487 A2 | 12/1999 |
| JP | A-63-281088 | 11/1988 |
| JP | A-3-131790 | 6/1991 |

\* cited by examiner

*Primary Examiner*—Thomas H. Tarcza
*Assistant Examiner*—Brian Andrea
(74) *Attorney, Agent, or Firm*—Nixon & Vanderhye PC

(57) ABSTRACT

A forward condition detecting apparatus for vehicles has a laser radar device mounted on a vehicle. A front height sensor and a rear height sensor detect a front height and a rear height of the vehicle, respectively. An electronic control unit calculates an angle of inclination of the vehicle relative to a reference plane based, on a difference between the detected front height and rear height. The electronic control unit then calculates a laser beam radiation angle based on the calculated angle of inclination. The electronic control unit controls an angular position of the laser radar device based on the calculated radiation angle so that the laser beam may be maintained leveled generally in parallel with the reference plane irrespective of the inclination of the vehicle. The laser radar device is preferably mounted in a vehicle front headlight unit to be driven together with a headlight lamp.

17 Claims, 5 Drawing Sheets

FORWARD CONDITION DETECTING APPARATUS FOR VEHICLES

CROSS REFERENCE TO RELATED APPLICATION

This application is based on and incorporates herein by reference Japanese Patent Applications No. 2000-56579 filed Mar. 2, 2000 and 2000-78433 filed Mar. 21, 2000.

BACKGROUND OF THE INVENTION

1. Field of the Invention

This invention relates to an apparatus for vehicles for detecting forward condition such as information existing ahead of a vehicle and related to safety drive.

2. Related Art

Laser radar devices are proposed to detect vehicle forward condition such as road conditions, preceding vehicles and the like. The laser radar device is generally installed on a front bumper of a vehicle. The laser radar device radiates a laser beam forward in a predetermined angle relative to the reference plane such as the ground plane as long as the vehicle posture is stable, for instance, when the vehicle is at rest or in a cruising condition. As a result, the laser radar device is enabled to receive a reflected beam from a front object and detect the front object as the forward condition based on the received beam.

The laser beam is radiated in the more upward direction than in the predetermined angle direction, when the vehicle is loaded with heavy stuff at the rear side or the vehicle is accelerated. The laser beam is radiated in the more downward direction than in the predetermined angle direction, when the vehicle is decelerated. In those instances, the forward condition detecting operation will be affected by the vehicle posture.

SUMMARY OF THE INVENTION

It is therefore an object of the present invention to provide a forward condition detecting apparatus which is capable of detecting forward condition without being affected by changes in vehicle drive condition or loading.

It is another object of the present invention to provide a forward condition detecting apparatus which is simple in construction and is capable of being driven together with a front headlight lamp.

A forward condition detecting apparatus for vehicles has a laser radar device which detects forward condition of a vehicle. An electronic control unit calculates an angle of inclination of the vehicle. The electronic control unit then calculates a radiation angle based on the calculated angle of inclination. The electronic control controls an angular position of the laser radar device based on the calculated radiation angle so that a laser beam may be maintained radiated generally in parallel with the reference plane irrespective of the inclination of the vehicle. The angle of inclination of the vehicle is calculated based on a difference between a front height and a rear height of the vehicle.

Preferably, the laser radar device is provided in a front headlight unit and driven together with a front headlight lamp in response to the calculated angle of inclination.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
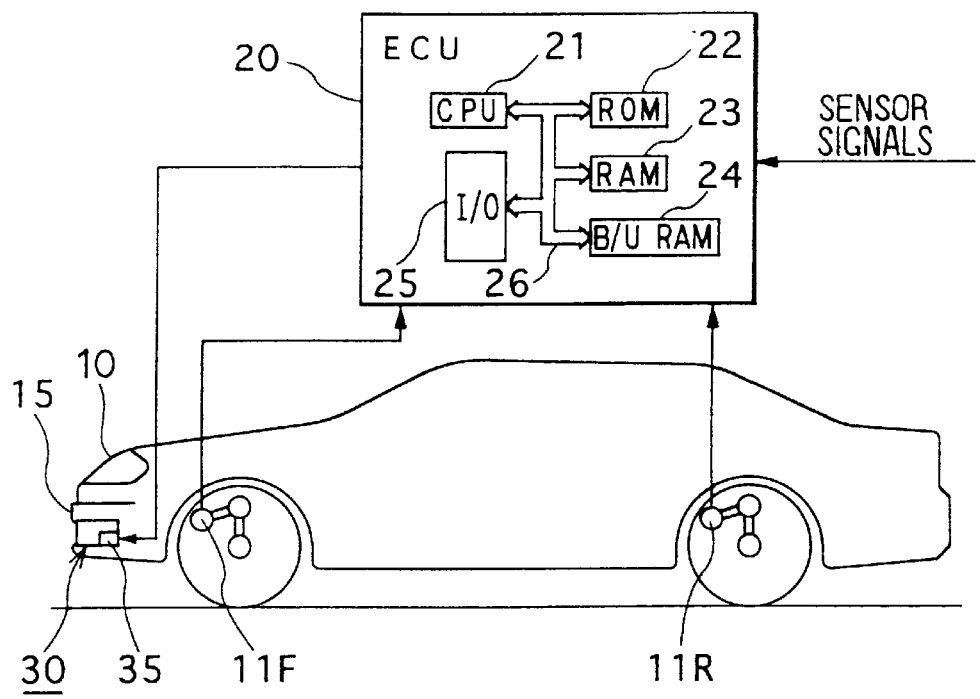
FIG. 1 is a schematic view showing a forward condition detecting apparatus according to a first embodiment of the present invention.

The present invention will be described in detail with reference to various embodiments, in which the same reference numerals are used to designate the same or similar parts.

First Embodiment

Referring first to FIG. 1, a front height sensor 11F and a rear height sensor 11R are attached to a front wheel-side suspension and a rear wheel-side suspension of a vehicle, respectively. The front suspension is provided between a vehicle chassis and a front axle of either right or left side, and the rear suspension is provided between the vehicle chassis and a rear axle of either right or left side. The front height sensor 11F detects a relative distance between the vehicle chassis and the front axle, and the rear height sensor 11R detects a relative distance between the vehicle chassis and the rear axle. The detected distances indicate a front height HF and a rear height HR of the vehicle, respectively. Output signals of the height sensors 11F and 11R are input to an electronic control unit (ECU) 20 together with other sensor output signals, so that a laser radar device 30 installed in a front bumper 15 below a headlight unit 10 is controlled electronically through an actuator 35 from time to time.

The ECU 20 includes a central processing unit (CPU) 21, a read-only memory (ROM) 22 for storing a control program and control constants, a random access memory (RAM) 23 for storing various data, a backup RAM 24, an input/output circuit 25, and a bus 26 connecting those circuits. The ECU 20 thus operate as a logical arithmetic unit which controls the laser beam radiation angle radiated from the laser radar device 30.

Figure 2:
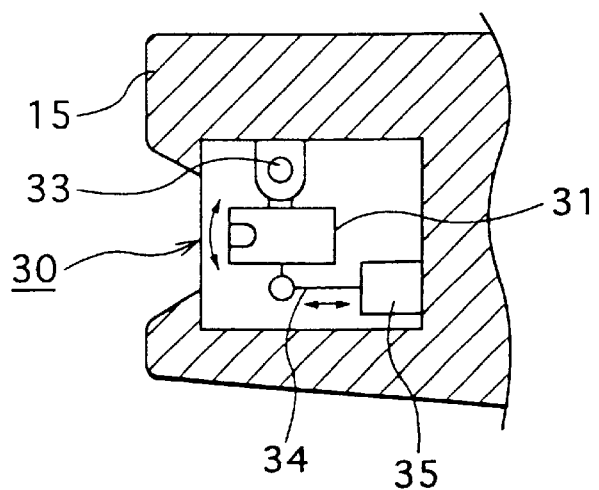
FIG. 2 is a sectional view of a laser radar device mounted in a front bumper of a vehicle in the first embodiment.

As shown in FIG. 2, the laser radar device 30 is constructed with a housing 31, a fixed support 33, a movable link 34 and the actuator 35 such as a stepper motor. The housing 31 accommodates therein a laser beam generator (not shown) and a reflected beam receiver (not shown). The fixed support 33 supports the housing 31 swingably in an arrow direction. The movable link 34 connects the housing 31 with the actuator 35, so that the housing 31 swings in correspondence with horizontal movement of the link 34 when the link 34 is driven by the actuator 35. The laser radar device 30 is designed in such a manner that the laser beam is radiated at a predetermined angle relative to a reference plane (e.g., ground plane) assuming that only a driver is in the vehicle. That is, the laser beam is radiated normally with the predetermined angle being 0°, in parallel with the ground plane.

Figure 3:
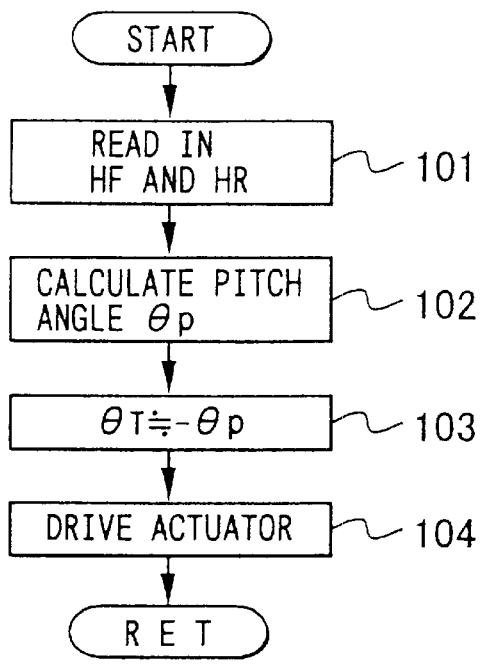
FIG. 3 is a flow diagram showing a radiation angle control process executed in the first embodiment.

The ECU 20, particularly the CPU 21 executes a control process as shown in FIG. 3 based on a control program stored in the ROM 22. This control process may be executed every predetermined time interval.

Specifically, the CPU 21 reads in the front height HF and the rear height HR detected by the front height sensor 11F and the rear height sensor 11R, respectively, at step 101. The CPU 21 then calculates the pitch angle θp (°) as follows relative to the predetermined reference plane (ground plane) by using the detected heights HF and HR and assuming a wheel base between the front axle and the rear axle is Lw. The pitch angle θp indicates inclination of the vehicle in the vehicle travel direction.

$$\theta p = \tan^{-1}\{(HF-HR)/Lw\}$$

The CPU 21 calculates a radiation angle θT at step 103 based on the calculated inclination angle θp so that the laser beam radiation angle is maintained in parallel with the ground plane. That is, the radiation angle θT is calculated as θT≈−θp. This angle θT is a corrective value by which the radiation angle caused by the vehicle inclination (θp) is corrected to the predetermined angle (0°). The CPU 21 then drives at step 104 the actuator 35 through the I/O circuit 25 based on the calculated value θT so that the laser beam may be maintained radiated at the predetermined angle relative the ground plane.

Figure 4A:
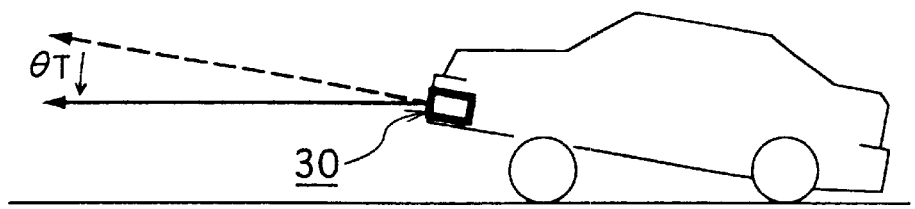
FIGS. 4A and 4B are schematic views showing operation modes of the first embodiment.
Figure 4B:
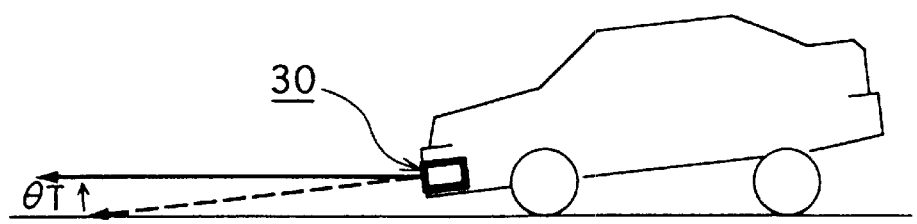

In operation of the first embodiment, as shown in FIG. 4A, the laser beam radiation is automatically corrected to the generally horizontal direction (solid line) from the upward-headed direction (dotted line) even when the vehicle front side is raised due to vehicle acceleration or heavy loading at the rear of the vehicle. Further, as shown in FIG. 4B, the laser beam radiation is automatically corrected to the generally horizontal direction (solid line) from the downward-headed direction (dotted line) even when the vehicle rear side is raised due to vehicle deceleration. Thus, according to the first embodiment, the laser radar device 30 is automatically leveled in such a manner the laser beam radiation angle can be maintained at a fixed angle irrespective of changes in the vehicle posture so that any front condition existing ahead of the vehicle can be detected accurately.

In the first embodiment, the laser beam radiation angle may be calculated by using only one of the front height HF or the rear height HR. It may also be calculated by detecting acceleration and deceleration of a vehicle. Further, the laser beam radiation angle may be corrected by filtering processing such as a moving average processing, which correspond to vehicle stop, cruising and acceleration/deceleration conditions, by detecting a vehicle speed and acceleration/deceleration magnitude.

The laser radar device 30 is comprised of, as shown in FIGS. 5A, 5B, 6A and 6B, a laser beam generator 301a, a polygon mirror 301b and a drive motor 301c, which form a laser beam radiator 301 in the known manner. Other components such as a laser beam receiver (not shown) are not shown in the figures. The polygon mirror 301b, which reflects the laser beam from the laser generator 301a frontward when rotated by the drive motor 301c, has a plurality of inclined surfaces around its axis of rotation. The surfaces are inclined by predetermined angles θi against the horizontal plane, respectively. The angles θi are different from each other, so that the reflected laser beams are directed up and down in each rotation of the polygon mirror 301b.

The inclination of the vehicle (pitch angle θp) is normally considered to vary in the range of +3° and −3° from the horizontal plane. If the laser radar device 30 is fixed to the vehicle chassis such as a front bumper and no automatic leveling is provided for the laser radar device 30, the polygon mirror 301b is required to have eight inclined surfaces (numbered from 1 to 8 in FIG. 6B) to cover the above variation in the pitch angle θp.

Figure 5A:
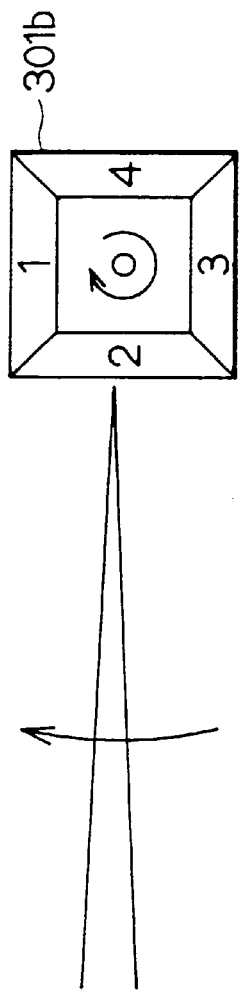
FIGS. 5A and 5B are schematic views of the laser radar device used in the first embodiment.
Figure 5B:
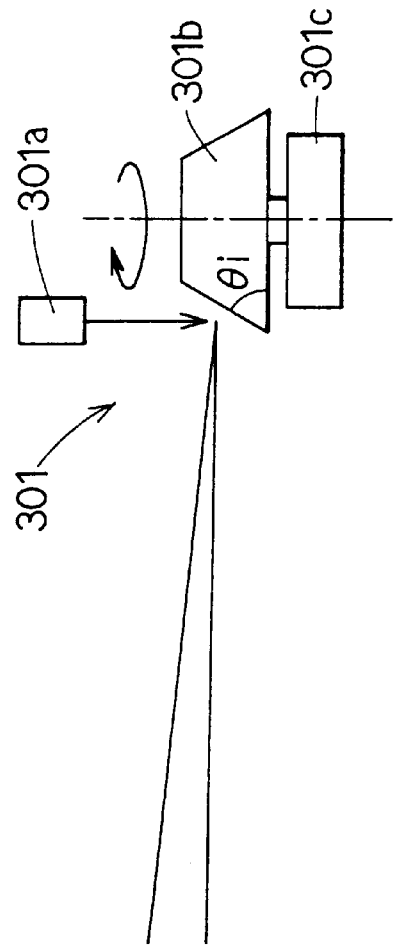
Figure 6A:
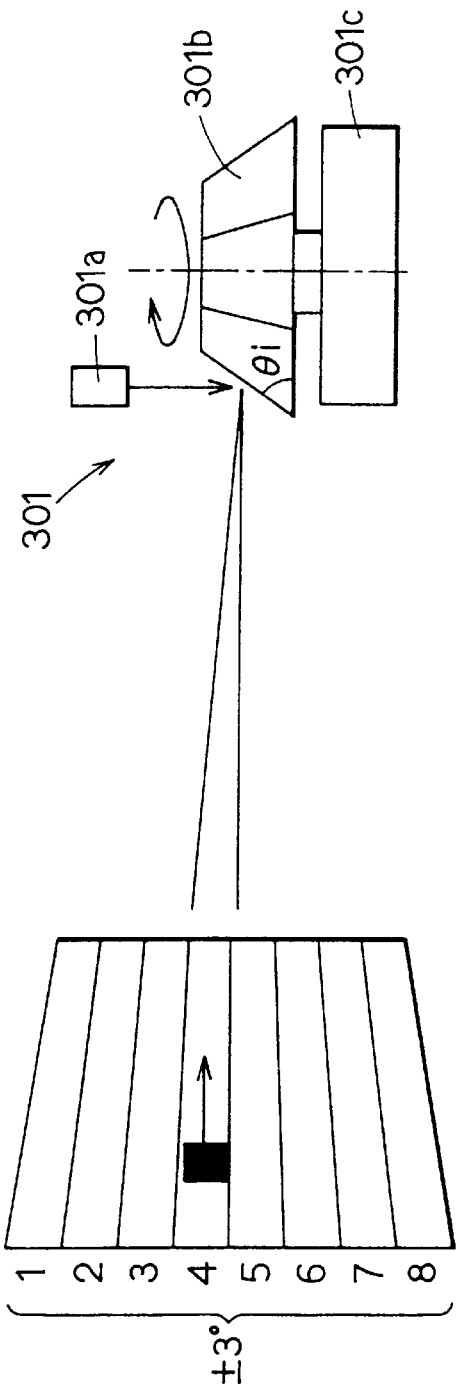
FIGS. 6A and 6B are schematic views of a laser radar device required when no automatic leveling operation is attained in the first embodiment.
Figure 6B:
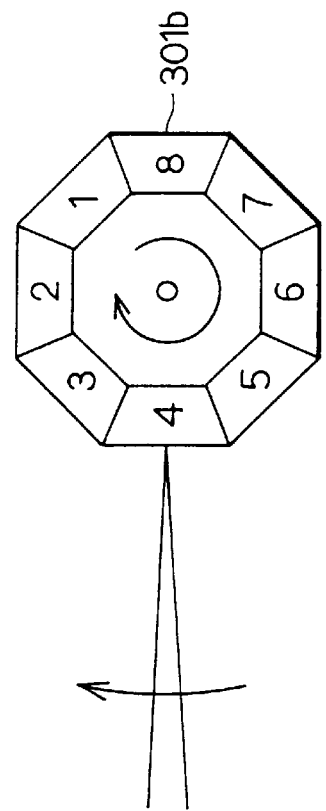

According to the first embodiment, however, the laser radar device 30 is automatically leveled, thus minimizing the range of variations in the angle of radiation of the laser beam, which the laser radar device 30 is required to cover. Thus, the number of surfaces of the polygon mirror 301b can be reduced to four (numbered from 1 to 4) as shown in FIG. 5B. As a result, the polygon mirror 301b can be sized small and the laser beam generator 301a can be positioned close to the polygon mirror 301b, thus enabling use of a compact-sized laser radar device.

Second Embodiment

Figure 7A:
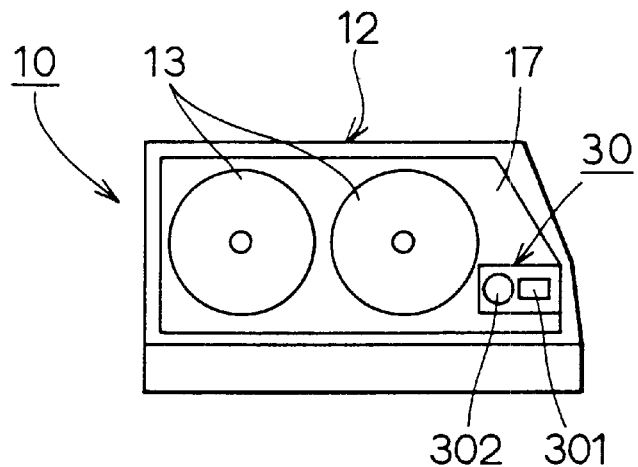
FIGS. 7A and 7B are a front view and a side view of a laser radar device mounted in a headlight unit of a vehicle according to a second embodiment of the present invention.
Figure 7B:
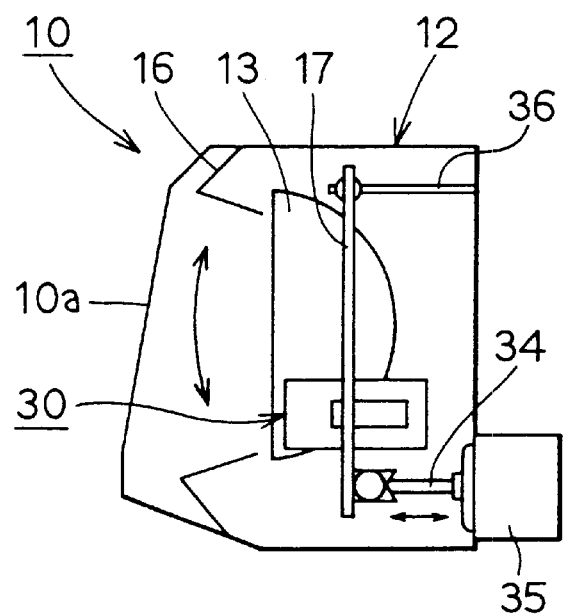

In a second embodiment, as shown in FIGS. 7A and 7B, the laser radar device 30 is mounted in the headlight unit 10 which is disposed right above the front bumper 15 (FIG. 1).

Specifically, the front headlight unit 10 has a cover lens 10a at the front side and a housing 12, which jointly define a closed chamber therein. In the chamber, a headlight lamp (not shown) is fixed to a reflector 13, and the reflector 3 is fixed to a board 17. A design panel 16 is attached to the housing 12 at a position ahead of the reflector 13. The board 17 is attached to a support member 36 at a top side end thereof and to the movable link 34 at a bottom side end thereof. The laser radar device 30 comprising the laser beam radiator 301 and a laser beam receiver 302 is fixedly attached to the board 17. The movable link 34 is coupled to the actuator 35 so that the bottom side of the board 17 is moved by the actuator 35 pivotally around its top side supported by the support member 36. As a result, the angles of radiation of the laser beam from the laser beam radiator 301 and the headlight from the reflector 17 are regulated simultaneously in response to the inclination of a vehicle by the ECU 20 in the same manner as in the first embodiment. The laser beam radiator 301 and the laser beam receiver 302 may be provided at separate locations on the board 17 or the reflector 13.

According to the second embodiment, the laser radar device 30 can be protected from dust and water by the cover lens 10a in addition to the automatic leveling of the angle of laser beam radiation. Further, the radiation angle of both headlight and laser beam can be automatically regulated by one actuator 35.

The present invention should not be limited to the disclosed embodiments and modifications, but may be implemented in many other ways without departing from the spirit of the invention.

What is claimed is:

1. A forward condition detecting apparatus for vehicles comprising:

parameter detecting means for detecting a parameter variable with inclination of a vehicle;

angle calculating means for calculating an angle of inclination of the vehicle relative to a reference plane based on the detected parameter;

forward condition detecting means movably installed on the vehicle for detecting forward condition of the vehicle; and control means for controlling an angle of the forward condition detecting means based on the calculated angle of inclination of the vehicle;

wherein the forward condition detecting means includes a laser radar device installed on a front bumper of the vehicle.

2. The forward condition detecting apparatus as in claim 1, wherein the parameter detecting means includes a vehicle height sensor which detects a height of the vehicle.

3. The forward condition detecting apparatus as in claim 1, wherein the control means compensates for a change of the angle of the forward condition detecting means caused by a change in the angle of inclination of the vehicle.

4. The forward condition detecting apparatus as in claim 1, wherein:
the parameter detecting means detects a front height and a rear height of the vehicle; and
the angle calculating means calculates the angle of inclination of the vehicle based on a difference between the front height and the rear height.

5. A forward condition detecting apparatus for vehicles comprising:
parameter detecting means for detecting a parameter variable with inclination of a vehicle;
angle calculating means for calculating an angle of inclination of the vehicle relative to a reference plane based on the detected parameter;
forward condition detecting means movably installed on the vehicle for detecting forward condition of the vehicle; and
control means for controlling an angle of the forward condition detecting means based on the calculated angle of inclination of the vehicle;
wherein the forward condition detecting means includes a laser radar device installed within a headlight unit of the vehicle.

6. The forward condition detecting apparatus as in claim 5, wherein the laser radar device is coupled with a headlight lamp of the headlight unit to be moved together with the head lamp by the control means.

7. A forward condition detecting apparatus for vehicles comprising:
a headlight unit including a headlight lamp;
parameter detector for detecting a parameter variable with an inclination of a vehicle;
angle calculator for calculating an angle of inclination of the vehicle relative to a reference plane based on the detected parameter;
forward condition detector movably installed on the vehicle for detecting a forward condition of the vehicle by radiating a beam and receiving a reflected beam separately from a light beam of the headlight unit; and
controller for controlling an angle of the forward condition detector based on the calculated angle of inclination of the vehicle.

8. The forward condition detecting apparatus as in claim 7, wherein the forward condition detector is movable together with the headlight lamp.

9. The forward condition detecting apparatus as in claim 7, wherein the forward condition detector includes a laser radar device which radiates a laser beam.

10. A method of detecting a forward condition in vehicles comprising:
detecting a parameter variable with an inclination of a vehicle;
calculating an angle of inclination of the vehicle relative to a reference plane based on the detected parameter;
detecting a forward condition of the vehicle using a forward condition detector movably installed on the vehicle; and
controlling an angle of the forward condition detector based on the calculated angle of inclination of the vehicle;
wherein the forward condition detector includes a laser radar device installed on a front bumper of the vehicle.

11. The method as in claim 10, wherein detecting the parameter variable with inclination of the vehicle includes detecting a height of the vehicle.

12. The method as in claim 10, wherein controlling the angle of the forward condition includes compensating for a change of the angle of the forward condition detector caused by a change in the angle of inclination of the vehicle.

13. The method as in claim 10, wherein:
detecting the parameter variable with the inclination of the vehicle includes detecting a front height and a rear height of the vehicle; and
calculating the angle of inclination includes calculating the angle of inclination of the vehicle based on a difference between the front height and the rear height of the vehicle.

14. A method of detecting a condition in vehicles comprising:
detecting a parameter variable with an inclination of a vehicle;
calculating an angle of inclination of the vehicle relative to a reference plane based on the detected parameter;
detecting a forward condition of the vehicle using a forward condition detector movably installed on the vehicle; and
controlling an angle of the forward condition detector based on the calculated angle of inclination of the vehicle;
wherein the forward condition detector includes a laser radar device installed within a headlight unit of the vehicle.

15. The method as in claim 14, wherein the laser radar device is coupled with a headlight lamp of the headlight unit to be moved together with the head lamp by the control means.

16. A forward condition detecting apparatus for vehicles comprising:
parameter detector for detecting a parameter variable with inclination of a vehicle;
angle calculator for calculating an angle of inclination of the vehicle relative to a reference plane based on the detected parameter;
forward condition detector movably installed on the vehicle for detecting a forward condition of the vehicle; and
controller for controlling an angle of the forward condition detector based on the calculated angle of inclination of the vehicle;
wherein the forward condition detector includes a laser radar device installed on the vehicle.

17. A method of detecting a forward condition in vehicles comprising:
detecting a parameter variable with an inclination of a vehicle;
calculating an angle of inclination of the vehicle relative to a reference plane based on the detected parameter;
detecting a forward condition of the vehicle using a forward condition detector movably installed on the vehicle; and
controlling an angle of the forward condition detector based on the calculated angle of inclination of the vehicle;
wherein the forward condition detector includes a laser radar device installed on the vehicle.

* * * * *